United States Patent [19]

Edgerley et al.

[11] Patent Number: 4,493,871
[45] Date of Patent: Jan. 15, 1985

[54] RESILIENT POLYURETHANE FOAM WITH IMPROVED RESISTANCE TO IGNITION

[75] Inventors: Peter G. Edgerley; Sidney R. D. Oldland, both of Welwyn Garden City, England

[73] Assignee: Imperial Chemical Industries PLC, England

[21] Appl. No.: 456,727

[22] Filed: Jan. 10, 1983

Related U.S. Application Data

[63] Continuation of Ser. No. 304,053, Sep. 21, 1981, abandoned, which is a continuation-in-part of Ser. No. 207,706, Nov. 17, 1980, abandoned, and a continuation-in-part of Ser. No. 260,840, May 5, 1981, abandoned, which is a continuation-in-part of Ser. No. 207,706, Nov. 17, 1980, abandoned.

[30] Foreign Application Priority Data

Nov. 12, 1980 [GB] United Kingdom ............... 8036318
Sep. 3, 1980 [GB] United Kingdom ............... 8028397

[51] Int. Cl.$^3$ .................... B32B 3/06; B32B 3/26; B32B 27/00
[52] U.S. Cl. .................... 428/308.4; 5/459; 5/470; 5/481; 428/71; 428/76; 428/316.6; 428/319.7
[58] Field of Search ............... 428/304.4, 308.4, 317.3, 428/319.3, 319.7, 921, 314.4, 314.8, 316.6, 424.6, 920, 921, 306.6, 71, 76; 5/459, 470, 481

[56] References Cited

U.S. PATENT DOCUMENTS

| | | | |
|---|---|---|---|
| 3,503,822 | 3/1970 | Turkewitsch | 428/322.7 |
| 3,691,265 | 9/1972 | Cobbledick | 428/319.7 |
| 3,770,569 | 11/1973 | Breiner | 428/921 |
| 3,861,994 | 1/1975 | Stark | 428/314.8 |
| 4,049,848 | 9/1977 | Goodale et al. | 428/319.7 |
| 4,092,752 | 6/1978 | Dougan | 5/459 |
| 4,129,676 | 12/1978 | Guglielmo | 428/319.7 |
| 4,131,700 | 12/1978 | Guglielmo | 428/319.7 |
| 4,221,835 | 9/1980 | Severus-Laubenfeld | 428/319.1 |

FOREIGN PATENT DOCUMENTS

| | | | |
|---|---|---|---|
| 910195 | 11/1962 | United Kingdom | 428/319.7 |
| 1165539 | 10/1969 | United Kingdom | 428/319.7 |
| 1268674 | 3/1972 | United Kingdom | 428/319.7 |
| 1499168 | 11/1976 | United Kingdom | 428/921 |
| 1499214 | 1/1978 | United Kingdom | 428/319.7 |
| 1509719 | 5/1978 | United Kingdom | 428/921 |

*Primary Examiner*—William J. Van Balen
*Attorney, Agent, or Firm*—Cushman, Darby & Cushman

[57] ABSTRACT

A resilient polyurethane foam with improved resistance to ignition which passes the flame test of BS 5852: Part 1 for material-covered fillings as used for upholstered furniture when adapted for testing the foam only, which foam has on at least one surface thereof at least one coating of a vinylidene chloride polymer of a composition thereof which polymer or composition is substantially absent from the interior of the foam, the amount of chlorine in the at least one vinylidene chloride polymer or composition thereof being at least 60% by weight based on the weight of vinylidene chloride polymer. The coating preferably incorporates a synergist compound, e.g. an oxide or sulphide of antimony. Also, a combination comprising a coated resilient polyurethane foam and a covering material which passes the flame test as carried out according to BS 5852: Part 1.

8 Claims, No Drawings

RESILIENT POLYURETHANE FOAM WITH IMPROVED RESISTANCE TO IGNITION

RELATED APPLICATIONS

This is a continuation application of U.S. application Ser. No. 304,053 filed Sept. 21, 1981, now abandoned, which is a Continuation-In-Part application of U.S. application Ser. No. 207,706 filed Nov. 17, 1980, now abandoned, and also U.S. application Ser. No. 260,840 filed May 5, 1981, now abandoned, and itself a Constinuation-In-Part application of said U.S. application Ser. No. 207,706.

The present invention relates to resilient polyurethane foam with improved resistance to ignition.

In recent years the use of resilient polyurethane foams as the interior components of articles such as upholstered furniture (chairs, sofas, couches, and the like), bedding mattresses and transport seatings (seatings in automobiles, buses, trains, ships and aircraft) has become widespread on account of the cheapness and effectiveness of the foams. Such foams are, however, normally very readily ignitable and once ignited usually exhibit a rapid spread of flame, together with the emission of toxic fumes. This danger has been emphasised by the occurrence of many accidental fires involving burning resilient polyurethane foam which have often resulted in serious (sometimes fatal) casualties.

There is therefore a need to improve the resistance to ignition of resilient polyurethane foam.

It has been proposed in the literature to impart fire resistance to resilient polyurethane foam by substantially impregnating the body of the foam with a fire-retardant material or combination of materials. Such impregnation is, for example, effected by adding the fire-retardant prior to or during preparation of the foam, or by impregnating the already-formed foam with a solution or dispersion of the fire retardant (e.g. by squeezing the foam through rollers while immersed in a bath of the solution or dispersion) followed by removal of the solvent or dispersant.

Substantial impregnation of resilient polyurethane foam with a fire retardant, however, suffers from the disadvantages that the resiliency of the foam is usually deleteriously reduced and the cost of producing the finished article may be unacceptably increased because of the high level of fire-retardant employed.

It has been proposed in GB Pat. No. 1 509 719 to prepare a resilient polyurethane foam having improved resitance to ignition by using a technique which avoids substantially impregnating the body of the foam. In this technique, only the surface region of the foam is treated with a fire-retardant material, a flexible coating of such a material being formed on the surface of the foam which only slightly penetrates the body of the foam. The fire-retardant coating of GB Pat. No. 1 509 719 is said to comprise a polymeric binder that is inherently fire-retardant and/or contains a flame-spread inhibiting additive. The text of GB Pat. No. 1 509 719 specifies that suitable inherently fire-retardant polymers are, for example, halogen-containing polymers such as polychloroprene rubber, plasticised polyvinyl chloride and plasticised polyvinylidene chloride.

On application of this technique for the production of coated resilient polyurethane foam components for use in upholstered furniture and the like, it is nevertheless our consideration that halogen-containing polymers are by no means generally acceptable for use as the coating material, even though they will all no doubt impart some improvement to the ignition resistance of the foam. Thus we have found that polyvinyl chloride-coated resilient polyurethane foam, when used in combination with a covering material, is unlikely to pass the flame test of BS 5852: Part 1 for a combination of a material cover and a filling as used for upholstered furniture (this test method will be described in more detail hereafter). Similarly, polychloroprene rubber-coated resilient polyurethane foam is also likely to be unsuitable since it contains less chlorine than does polyvinyl chloride.

We have, even so, found that a certain selected class of halogen-containing polymers are acceptable for use as coating materials for resilient polyurethane foams to be used in upholstered furniture and the like, since they provide sufficient ignition resistance to enable the flame test of BS 5852 Part 1 to be passed given that a sufficient coating weight appropriate to the nature of the covering material is employed.

According to the present invention there is provided a resilient polyurethane foam with improved resistance to ignition which passes the flame test of BS 5852: Part 1 for material-covered fillings as used for upholstered furniture when adapted for testing the foam only, which foam has on at least one surface thereof at least one coating of at least one vinylidene chloride polymer or a composition thereof which vinylidene chloride polymer or composition thereof is substantially absent from the interior of the foam, the amount of chlorine in the at least one one vinylidene chloride polymer or composition thereof being at least 60% by weight based on the weight of the at least one vinylidene chloride polymer.

The resilient polyurethane foam of the invention is thus coated with a vinylidene chloride polymer or composition thereof containing at least 60% by weight of chlorine (based on the weight of vinylidene chloride polymer). The coated foam is defined in terms of its passing an adapted form of the flame test of BS 5852: Part 1 wherein only the coated foam is tested (and not the material-covered foam); this adapted test is easier and quicker to undertake than the full test and is useful in that a coated foam which passes the adapted flame test of BS 5852: Part 1 is likely to provide a foam/cover combination which passes the full test of BS 5852: Part 1 with most (though not necessarily all) covering materials.

The recently drafted test method, BS 5852: Part 1 (1979), defines a two-part test for assessing the ignitability of upholstered furniture composites comprising a covering material and an upholstery filling. In the first part of the test, a smouldering cigarette is placed in the test rig at the crutch between 450×300×75 mm and 450×150×75 mm test pieces, the test pieces having an upholstery filling and a covering material and being respectively vertically and horizontally disposed so as to represent a seat. If progressive smouldering or flaming is observed at any time within 1 hour of the placement of the cigarette, a failure rating is given. If progressive smouldering or flaming is not observed, the seat is re-tested at another crutch position with a fresh cigarette. If progressive smouldering or flaming is observed, a failure rating is given. If no progressive smouldering or flaming is observed in the re-test, a pass rating is given. In the second part of the test, which uses the same rig, a butane flame (simulating a burning match) is applied at the crutch for 20 seconds and then removed.

If progressive smouldering or flaming is observed, a failure rating is given. If progressive smouldering or flaming is not observed within 120 seconds, the flame test is repeated at another crutch position. If progressive smouldering or flaming is not observed, a pass rating is given. The flame test is by far the more critical part of the test since many combinations which pass the smouldering cigarette test will fail the flame test, and a combination which passes the flame test always passes the cigarette test.

In the adapted form of the flame test, which is applied to foam per se and not to material-covered foam, a butane flame (simulating a burning match) as defined in BS 5852: Part 1 is applied to one position near to the bottom of a vertically disposed surface of the foam for 20 seconds. On removal of the foam, an observation for flaming or progressive smouldering is made. If flaming or progressive smouldering is observed, a failure rating is given. If flaming or progressive smouldering is not observed, a pass rating is given. It is thus apparent that in the adapted flame test it is not necessary to employ the test rig used for the full test nor the foam dimensions used for the full test.

While all the surfaces of the resilient polyurethane foam may be coated with the vinylidene chloride polymer or polymer composition, it is within the scope of the invention (and more economic) to only coat that surface, or those surfaces, which in use are likely to experience the accidental application of a fire-causing means, such as a smouldering cigarette or a lighted match.

To achieve ignition resistance which is uniformly effective over the surface of the coated resilient foam, the coating should of course be reasonably evenly distributed over the foam surface.

The vinylidene chloride polymer or composition thereof is in one embodiment of the invention applied to the foam as a solution or latex dispersion in a liquid carrier medium. In the case of a solution, the carrier liquid may be an organic liquid; in the case of a latex dispersion the carrier liquid is normally water. The latex or solution should, of course, flow well so that the vinylidene chloride polymer or composition thereof may be evenly distributed over the surface to which it is applied. In general, it is preferable to apply the vinylidene chloride polymer or polymer composition to the foam in the form of an aqueous latex rather than from an organic solution since this avoids the use of expensive organic liquids which are frequently inflammable and/or toxic and may swell the foam. The latex or solution may be applied by any conventional method, e.g. by brushing, spraying, dipping, or by roller application. The liquid dispersant or solvent of the latex or solution must be removed after application, e.g. by air-drying in an oven or under ambient conditions, or by forcing hot air directly onto the surface or surfaces being coated. The resulting coating may extend to a very shallow degree into the foam to which it has been applied.

Alternatively, in another embodiment of the invention, the vinylidene chloride polymer or composition thereof may be applied to the foam as a phase dispersed in a discrete thin layer of a polymeric material; the layer's thickness is usually in the range 0.5 to 10 mm, preferably 1 to 6 mm. The thin layer of polymeric material may itself be foamed and may conveniently also be a polyurethane foam. The dispersion into the thin layer may be effected by any convenient method, e.g. by brushing, roller application, or spraying of a solution or latex of the vinylidene chloride polymer or composition thereof (which will cause substantial impregnation in a thin foamed layer) or by squeezing the thin foamed layer in a bath of the solution or latex. This embodiment has the advantage that it avoids the need to coat and dry the bulk resilient polyurethane foam on the same premises. The resulting coated foams are also exceptionally resilient.

While a single coating of a vinylidene chloride polymer or polymer composition according to the invention significantly improves the ignition resistance of a resilient polyurethane foam, if still further ignition resistance is required a plurality of such coatings, one upon the other, may be applied - although the more coatings that are applied, the greater may be the detraction from the advantages of retained resiliency and lowered cost.

It is to be understood that the coating of the vinylidene chloride polymer or composition thereof which has been derived from the direct application of a solution or latex dispersion of the vinylidene chloride polymer or composition thereof to the foam should preferably be an adherent one, i.e. the coating should preferably adhere properly to the surface to which it has been applied. Foams having a coating formed from a dried solution or latex of the vinylidene chloride polymer or composition thereof which is not properly adherent, being e.g. dusty or flaky, are not preferred in the present invention since there is a danger that such a coating may to a certain extent become removed after a period of time thereby rendering an article containing the coated foam potentially less ignition resistant. Whether or not a coating of a vinylidene chloride polymer or composition thereof is properly adherent will depend on a variety of factors, including the nature of the vinylidene chloride polymer itself and the method and/or conditions for the removal of the liquid carrier for the latex or solution of the vinylidene chloride polymer or polymer composition (e.g. drying temperature). Generally speaking, other things being equal, increased polarity of the vinylidene chloride polymer improves adhesion. All the above factors should be investigated experimentally in order to achieve a coated foam with a properly adherent coating.

Where the coating of the vinylidene chloride polymer or composition thereof has been derived from a discrete thin layer of a polymeric material having dispersed therein the vinylidene chloride polymer or composition thereof, the coating need not, from the point of view of effective ignition resistance, preferably be an adherent one since in this embodiment it is unlikely that a non-adherent coating will become separated to any significant extent from the foam after a period of time so that an article containing the coated foam is unlikely to become potentially less ignition resistant. For aesthetic reasons, however, the coating in this embodiment is nevertheless preferably an adherent one (achieve e.g. by gluing the discrete thin layer to the foam surface) since a non-adherent one when employed as the interior component of an upholstered article is liable to cause rucking during use of the article.

Methods for the preparation of polyurethane foams are very well known in the art. The principle raw materials used are diisocyanates, polyfunctional polyols, blowing agents, catalysts and surfactants. Various diisocyanates have been used to prepare resilient polyurethane foam, including tolylene diisocyanate (TDI) and diphenylmethane diisocyanate. The polyols employed are hydroxyl terminated polyethers or polyesters. The polyesters are primarily adipate esters of diols and triols. The polyethers are primarily adducts of alkylene (usually propylene) oxide with diols, triols or alcohols of higher functionality. When primary terminal hydroxyl groups are desired, the poly(oxyalkylene) derivatives are capped with ethylene oxide. Water is used in all commercial resilient polyurethane foams to produce carbon dioxide as the blowing agent.

The vinylidene chloride polymers of the present invention are also well known in the art; polymerisation is normally effected in aqueous suspension or emulsion using a free-radical yielding initiator. A vinylidene chloride homopolymer contains 73% by weight of chlorine, so that such a polymer may, if desired, be used in the invention without any additional chlorine-containing compound being present, although in the embodiment where the coating is formed from the direct application of a solution or latex to the resilient polymer, it is preferably employed in admixture with a suitable binder material to bind it to the foam (a vinylidene chloride homopolymer solution or latex on its own is not normally film-forming and usually yields a dusty substrate on drying). A vinylidene chloride copolymer containing 82% by weight of polymerised vinylidene chloride units contains 60% by weight of chlorine (assuming non-chlorine-containing comonomer), so that a vinylidene chloride copolymer containing at least 82% by weight of polymerised vinylidene chloride units may be used in the invention without any additional chlorine-containing compound being present. Vinylidene chloride copolymers containing less than 82% by weight of polymerised vinylidene chloride units (where the comonomer or comonomers do not contain chlorine or contain an amount of chlorine such that the copolymer does not contain at least 60% by weight of chlorine) must be used in conjunction with another chlorine-containing compound or compounds (e.g. another chlorine-containing polymer or a chlorinated plasticiser such as a chlorinated paraffin) such that the copolymer composition as a whole contains at least 60% by weight of chlorine (based on the weight of vinylidene chloride polymer). A vinylidene chloride copolymer containing less than 82% by weight of vinylidene chloride units may be used alone in the present invention only if the comonomer (or comonomers) thereof contains chlorine such that the amount of chlorine in the copolymer is at least 60% by weight.

It is in fact preferable in the present invention that the vinylidene chloride polymer is a copolymer since the copolymeric component may be such as to reduce the symmetry of the polyvinylidene chloride chains and lower the glass transition temperature (Tg) of the polymer so that individual particles fuse to form a coating of excellent adhesion on drying (at room temperature or above) an applied latex or solution of the polymer or polymer composition thereof. The preferred copolymers contain 95 to 82% by weight of vinylidene chloride units and corresponding from 5 to 18% by weight of at least one ethylenically unsaturated comonomer. Such copolymers have been disclosed widely in the prior art. The choice of the comonomer and the amount used within the limits specified above may depend, inter alia, upon the temperature at which the coating from the dispersion is to be dried; however, the choice is preferably such that the Tg of the copolymer particles in the amorphous form is not greater than about 50° C. because of the ease with which well-adhered coatings are formed with particles of such a copolymer under normal drying conditions.

In general the comonomeric material employed with the vinylidene chloride is selected from: (a) monoethylenically unsaturated mono- and polycarboxylic acids and their esters, anhydrides and nitriles, (b) esters of mono- or polycarboxylic fatty acids and monoethylenically unsaturated alcohols, (c) halogen-substituted derivatives of ethylene, (d) monoethylenically unsaturated aldehydes and ketones, and (e) dienes. Particular examples are: (a) acrylic acid, α-chloroacrylic acid, methacrylic acid, maleic acid, fumaric acid, crotonic acid, mesaconic acid, aconitic acid and itaconic acid and their esters, anhydrides and nitriles; (b) vinyl esters of monocarboxylic fatty acids; (c) vinyl halides; (d) methacrolein and vinyl methyl ketone; and (e) isoprene and butadiene. Acrylic and methacrylic acids and their esters with alcohols having up to 8 carbon atoms such as methyl acrylate and methyl methacrylate, acrylonitrile, methacrylonitrile, maleic and fumaric acid and itaconic acids and their partial and complete esters with alcohols having up to 8 carbon atoms, maleic anhydride, itaconic anhydride, vinyl acetate and vinyl chloride may be regarded as particularly suitable.

The optimum choice of comonomeric material and the amount used to achieve optimum bonding with the substrate and optimum spreading and flow in the coating compositions may be determined by experiment.

Increased polarity of the vinylidene chloride copolymer generally improves adhesion to most polyurethane foams. A copolymer that is useful for most applications is a copolymer of vinylidene chloride, acrylonitrile, and a monomer containing at least one free (i.e. uncombined) carboxylic acid group, e.g. acrylic acid. This monomer should be present in the copolymer in amounts of at least 0.5/x mole % but generally not more than 5/x mole % where x is the number of free carboxylic acid groups in the molecule of the monomer. Suitable copolymers of this kind and methods of producing them are described in GB Pat. No. 1 011 500.

While many vinylidene chloride copolymers, as mentioned above, form coatings of excellent adhesion on drying applied latices or solutions thereof, it is sometimes observed that the coating produced becomes stiffer with increased drying temperature. Thus, sometimes, while a coating formed by drying a vinylidene chloride copolymer latex at ambient temperature may be readily flexible on the foam, coatings formed by drying at more elevated temperatures (e.g. at >25° C., say 30° to 85° C.) may be stiffer; while this has virtually no effect on the resiliency of the bulk foam it does mean that the coating on the foam surface may tend to crack somewhat when localized pressure is applied thereto; this effect, while having no real practical drawback may not be liked by the upholstery manufacturer and accordingly is perhaps best avoided if possible. In this respect, since it may be sometimes more economic to employ an elevated drying temperature (to reduce the time taken for drying), it may be advantageous to ensure that a very readily flexible coating is achieved at both ambient and elevated drying temperatures. We have found that this may be achieved by incorporating a drying modifier such as glycol (e.g. in an amount of 2-10% by weight based on the weight of the vinylidene chloride copolymer) with the vinylidene copolymer latex if that copolymer has a tendency to form stiffer coatings at elevated drying temperatures. Alternatively a latex comprising a mixture of a vinylidene chloride homopolymer and a vinylidene chloride copolymer may achieve the same effect, the vinylidene chloride copolymer acting as a binder material for the vinylidene chloride homopolymer.

In a preferred embodiment of the invention the coating on the foam comprises a vinylidene chloride polymer composition which includes at least one vinylidene chloride polymer and at least one synergist fire-retardant compound; by a synergist fire-retardant compound is meant in this specification a compound which effects a synergist fire-retardant action when used in combination with a high halogen-containing compound. Particularly suitable synergist compounds for use in the present invention are synergist metal compounds such as the oxides and sulphides of Sb, Fe, Mo, and Sn; of these the oxides and sulphides of Sb are particularly preferred. Borates of certain metals (e.g. Zn) may also be used. The synergist is usually employed in an amount of 5–180%, preferably 20–180%, and more preferably 50–150%, by weight based on the dry weight of the at least one vinylidene chloride polymer used for the coating. The synergist compound may be incorporated simply by adding it e.g. as powder, granules, suspension or latex, (with thorough mixing) to a latex or solution of the vinylidene chloride polymer. Alternatively, the synergist compound may be incorporated in the reaction medium during or at end of the polymerisation process to make the vinylidene chloride polymer - in which case the synergist may become incorporated as particles which are very effectively distributed in the coating.

In a further aspect of the invention, the coating according to the invention is provided by a vinylidene chloride polymer composition comprising a vinylidene chloride polymer plasticised with a plasticiser which is preferably normally non-inflammable or itself possesses fire-retardant properties. Examples of such plasticisers include triorgano phosphates in which the organo radicals are alkyl (optionally substituted) and/or aryl (optionally substituted) radicals (e.g. trichloroethyl phosphate, tritolyl phosphate and trixylyl phosphate), and chlorinated paraffins. Volatile materials which have a plasticising effect on vinylidene chloride polymers but which are removed on drying (e.g. isopropanol) may also be incorporated in an applied latex or solution of the vinylidene chloride polymer or polymer composition. It is believed that the presence or effect of the plasticiser is to provide a smoother coating which will have less tendency to become removed from the resilient foam surface over a prolonged period of time.

The coated polyurethane foam of the present invention is intended for use as an interior filler component of articles such as upholstered furniture, bedding mattresses and transport seatings as discussed above. Such articles will normally comprise an assembly which includes resilient polyurethane polymer foam filler at least partially surrounded by a covering material, e.g a fabric based on materials such as cotton, wool, polypropylene, nylon, polyester and acrylic fibre. The resistance of such an article to ignition will depend, inter alia, on the nature of the material of the covering as well as on the nature of the foam. This is because the covering material itself may, once ignited, augment the effect of the original fire-causing means e.g. by providing a very hot flame on its own account, thereby requiring the coated foam to possess a degree of ignition resistance in excess of that which would otherwise be satisfactory for the uncovered resilient foam. Conversely, the covering material may diminish the effect of the original fire-causing means thereby allowing a degree of ignition resistance in the coated foam which is less than that which would otherwise be needed for the uncovered resilient foam. (In this respect, it may be advantageous in some cases to also coat the inside surface of the fabric with a vinylidene chloride polymer in order to lower its flammability). Accordingly, the degree of ignition resistance of the resilient polyurethane foam in any given combination of foam and covering material, which may be increased by increasing the weight of the coating of vinylidene chloride polymer or polymer composition on the foam surface, e.g. by increasing the quantity of vinylidene chloride polymer (and synergist compound if used) in a single coat and/or by employing a plurality of coatings, should be adjusted to provide a finished article of acceptable ignition resistance.

Accordingly there is further provided according to the invention a combination comprising a resilient polyurethane foam and an upholstery covering material which combination passes the flame test of BS 5852: Part 1, which foam has on at least one surface thereof at least one coating of at least one vinylidene chloride polymer or a composition thereof which vinylidene chloride polymer or composition thereof is substantially absent from the interior of the foam, the amount of chlorine in the at least one vinylidene chloride polymer or composition thereof being at least 60% by weight based on the weight of the at least one vinylidene chloride polymer.

Generally speaking, a coat weight (defined in terms of surface density) of at least 50 g/m$^2$, preferably at least 150 g/m$^2$, is suitable for most articles. The upper limit of the coat weight will depend on features such as cost and acceptable resiliency loss although an upper limit of 1000 g/m$^2$ for surface density, particularly 600 g/m$^2$, would be suitable for most articles. In many cases, the coat weight (in terms of surface density) will lie within the range 70–500 g/m$^2$.

The following Examples now illustrate the present invention. Unless otherwise specified all parts and percentages are by weight. Comparative Examples are denoted by the prefix C.

In many of these Examples (Nos. 1 to 33), the adapted form of the flame test of BS 5852: Part 1 is used to assess the ignition resistance of resilient foam samples, some being according to the invention and others not being according to the invention.

In other Examples (Nos. 34 to 54), the full test of BS 5852: Part 1 is used to assess the ignition resistance of combinations of resilient foam samples and different fabric coverings.

The resilient polyurethane foam samples used for the Examples were chemically identical and were obtained from a commercially available source.

EXAMPLE C1

A rectangular block of untreated resilient polyurethane foam of dimensions 150×150×75 mm was subjected to the adapted flame test for ignition resistance (a 150×150 mm surface being used for the test).

EXAMPLE 2

A rectangular block of resilient polyurethane foam of dimensions 150×150×75 mm was brush-coated on a 150×150 mm surface with an aqueous latex of a vinylidene chloride polymer (45% by weight polymer solids content), the vinylidene chloride polymer being a copolymer of vinylidene chloride, acrylonitrile and methyl acrylate containing 91% by weight of polymerised vinylidene chloride units, i.e. containing 66% by weight of Cl. The coating latex was dried with hot air from a hairdryer to provide a well-adhered coating. The weight increase was determined thereby allowing the coat weight (surface density) to be calculated. The foam was tested for ignition resistance (using the adapted flame test) by applying the butane flame near to the bottom of the coated surface.

EXAMPLE 3

The procedure of Example 2 was repeated except that the applied latex contained $Sb_2O_3$ which had been added thereto (with thorough mixing) in the form of a very fine powder in an amount of 89% by weight based on the weight of the vinylidene chloride polymer. The coating formed was well-adhered.

EXAMPLE 4

The procedure of Example 2 was repeated except that the foam block had dimensions of 300×150×75 mm and that the vinylidene chloride polymer latex was diluted with an equal volume of water and applied with a roller onto a 300×150 mm surface. The coating formed was well-adhered.

The details of Examples 1–4, together with the ignition resistance results are summarised in the following Table 1.

TABLE 1

| Ex No | Coating polymer applied | Synergist used and % by weight based on weight of coating polymer | % Cl by weight based on weight of coating polymer | Coating weight g/m² | Ignition resistance (adapted flame test of BS 5852: Part 1) |
|---|---|---|---|---|---|
| C1 | None | None | — | — | Fail (very rapid burning) |
| 2 | VDC/ AN/ MA Copol. | None | 66% | 151 | Pass |
| 3 | VDC/ AN/ MA Copol. | $Sb_2O_3$ (89%) | 66% | 178 | Pass |
| 4 | VDC/ AN/ MA Copol. | None | 66% | 107 | Pass |

VDC = vinylidene chloride, AN = acrylonitrile, MA = methyl acrylate.

EXAMPLES 5 TO 9

In these Examples an aqueous latex of a vinylidene chloride polymer (45% by weight polymer solids content), the vinylidene chloride polymer being a copolymer of vinylidene chloride, acrylonitrile and acrylic acid, the copolymer containing 89% by weight of polymerised vinylidene chloride units, i.e. containing 65% by weight of Cl, and containing about 2% by weight of acrylic acid units, admixed with varying amounts of $Sb_2S_5$ (see Table 2), added in the form of a very fine powder, was employed for coating resilient polyurethane rectangular blocks of dimensions 150×150×75 mm, the coatings being applied to one of the 150×150 mm surfaces in each case. In Examples 6 and 9, the latex mixture was diluted to twice its initial volume with water before application to the foam surface.

Coating was effected by applying the latex mixture with a brush, followed by drying in a hot air oven at 70° C. The weight increase was determined in each case, thereby allowing the coat weight (surface density) to be calculated in each Example. The coatings formed were well-adhered.

The details of Examples 5 to 9 and the ignition resistance results are summarised in the following Table 2.

TABLE 2

| Ex No | Coating polymer applied | Synergist used and % by weight based on weight of coating polymer | % Cl by weight based on weight of coating polymer | Coating weight g/m² | Ignition resistance (adapted flame test of BS 5852: Part 1) |
|---|---|---|---|---|---|
| 5 | VDC/ AN/ AA Copol. | $Sb_2S_5$ (117%) | 65% | 75 | Pass |
| 6 | VDC/ AN/ AA Copol. | $Sb_2S_5$ (117%) | 65% | 102 | Pass |
| 7 | VDC/ AN/ AA Copol. | $Sb_2S_5$ (87%) | 65% | 49 | Pass |
| 8 | VDC/ AN/ AA Copol. | $Sb_2S_5$ (87%) | 65% | 53 | Pass |
| 9 | VDC/ AN/ AA Copol. | $Sb_2S_5$ (47%) | 65% | 102 | Pass |

AA = acrylic acid

EXAMPLE C10 TO C12

The procedure of Examples 5 to 9 was repeated except that the vinylidene chloride polymer latex was replaced by a polytetrafluoroethylene latex (57.5% by weight polymer solids content) and the synergist, if employed, was $Sb_2O_3$, again added in the form of a very fine powder (amounts used as shown in Table 3). In Example C10, the latex used was diluted to four times its initial volume with water before application to the foam, in Example C11 to three times its initial volume and in Example 12 to twice its initial volume. The coatings formed were well-adhered.

The details of Examples C10 to C12 and the ignition resistance results are summarised in Table 3.

TABLE 3

| Ex. No. | Coating polymer applied | Synergist used and % by weight based on weight of coating polymer | Coating weight g/m² | Ignition resistance (adapted flame test of BS 5852: Part 1) |
|---|---|---|---|---|
| C10 | PTFE | $Sb_2O_3$ (348%) | 71 | Fail |
| C11 | PTFE | $Sb_2O_3$ (174%) | 89 | Fail |
| C12 | PTFE | None | 138 | Fail |

PTFE = polytetrafluoroethylene

EXAMPLES 13 TO 20

The procedure of Examples 5 to 9 was repeated except that the synergist used in Examples 13 to 18 was Sb$_2$O$_3$ (again added in the form of a very fine powder) and in Examples 19 and 20 was MoO$_3$ (added in the form of a very fine powder) (amounts employed as shown in Table 4). In Examples 14 and 17 the latex used was diluted to twice its initial volume with water before application to the foam, while in Examples 15 and 16 the latex was diluted to four times its initial volume with water before application to the foam. In Examples 17 and 18, isopropanol was included with the latex mixture (in amounts of 311% and 22% by weight based on the weight of vinylidene chloride polymer). In Example 20, the coating was allowed to dry by slow evaporation in air instead of by heating in an air oven. In Example 18, two coats were applied to the foam (drying after each application). The coatings formed were well-adhered.

The details of Examples 13 to 20 and the ignition resistance results are summarised in Table 4.

TABLE 4

| Ex | Coating polymer applied | Plasticiser used and % by weight based on weight of coating polymer | Synergist used and % by weight based on weight of coating polymer | % Cl by weight based on weight of coating polymer | Coating weight g/m$^2$ | Ignition resistance (adapted flame test of BS 5852: Part 1) |
|---|---|---|---|---|---|---|
| 13 | ADC/AN/AA Copol. | None | Sb$_2$O$_3$ (89%) | 65% | 258 | Pass |
| 14 | VDC/AN/AA Copol. | None | Sb$_2$O$_3$ (89%) | 65% | 202 | Pass |
| 15 | ADC/AN/AA Copol. | None | Sb$_2$O$_3$ (89%) | 65% | 84 | Pass |
| 16 | VDC/AN/AA Copol. | None | Sb$_2$O$_3$ (89%) | 65% | 142 | Pass |
| 17 | VDC/AN/AA/ Copol. | isopropanol (311%) | Sb$_2$O$_3$ (89%) | 65% | 293 | Pass |
| 18 | VDC/AN/AA Copol. | isopropanol (22%) | Sb$_2$O$_3$ (89%) | 65% | 356 | Pass |
| 19 | VDC/AN/AA/ Copol. | None | MoO$_3$ (127%) | 65% | 458 | Pass |
| 20 | VDC/AN/AA Copol. | None | MoO$_3$ (127%) | 65% | 400 | Pass |

TABLE 5

| Ex No | Coating polymer composition applied | Synergist(s) used and % by weight based on weight of coating polymer composition | % Cl by weight based on weight of coating polymer | Coating weight g/m$^2$ | Ignition resistance (adapted flame test of BS 5852: Part 1) |
|---|---|---|---|---|---|
| 21 | Plasticised VDC/AN/AA Copol. | Sb$_2$O$_3$ (50%) | 71% | 524 | Pass |
| 22 | Plasticised VDC/AN/AA Copol. | Sb$_2$O$_3$ (25%) | 71% | 391 | Pass |

EXAMPLES 21 AND 22

The vinylidene chloride polymer latex used for Examples 5 to 9 was plasticised with a chlorinated paraffin plasticiser ('Cereclor' S52) containing 52% by weight of Cl so as to produce a stable emulsion of the plasticised vinylidene chloride polymer. The plasticised composition contained approximately 71% by weight of Cl, based on the weight of vinylidene chloride polymer, the Cl being contributed by both the vinylidene chloride polymer and the chlorinated paraffin plasticiser.

In Examples 21 and 22 samples of the latex which were mixed with different quantities of Sb$_2$O$_3$, again added in the form of a very fine powder, (see Table 5) and equal volumes of water, were applied to 150×150 mm surfaces of resilient polyurethane blocks (dimensions 150×150×75 mm) as in previous Examples (brush coating the surface, and drying in an air oven at 70° C.). The coatings formed were well-adhered.

The details of Examples 21 and 22 and the ignition resistance results are summarised in Table 5.

EXAMPLES 23 TO 33

In these Examples the coated foams employed in some of the preceding Examples were repeatedly subjected to the adapted flame test (the flame being applied to the same position on the foam surface)—the flame being removed for 5 seconds between each application. The number of times the flame could be applied before failure occurred was noted in each case.

The results are given in Table 6.

TABLE 6

| Ex. No. | Source of coated foam | Synergist used | Coating weight g/m$^2$ | No. of 20 sec. applications of flame before failure |
|---|---|---|---|---|
| 23 | Ex 2 | None | 151 | 4 |
| 24 | Ex 4 | None | 107 | 4 |
| 25 | Ex 3 | Sb$_2$O$_3$ | 178 | 10 |
| 26 | Ex 6 | Sb$_2$S$_5$ | 102 | at least 9* |
| 27 | Ex 13 | Sb$_2$O$_3$ | 258 | 4 |
| 28 | Ex 15 | Sb$_2$O$_3$ | 84 | 2 |
| 29 | Ex 17 | Sb$_2$O$_3$ (and | 293 | 2 |

TABLE 6-continued

| Ex. No. | Source of coated foam | Synergist used | Coating weight g/m² | No. of 20 sec. applications of flame before failure |
|---|---|---|---|---|
| | | isopropanol) | | |
| 30 | Ex 19 | MoO₃ | 458 | 14 |
| 31 | Ex 20 | MoO₃ | 400 | 2 |
| 32 | Ex 21 | Sb₂O₃ (plast. with chl. paraffin) | 524 | 9 |
| 33 | Ex 22 | Sb₂O₃ (plast. with chl. paraffin) | 391 | 7 |

*Not tested until failure

It can be seen that the presence of the synergist compound with the vinylidene chloride polymer, generally speaking, further improves the ignition resistance of the polyurethane foam in comparison to the use of the vinylidene chloride polymer on its own.

EXAMPLES C34, C35, 36, C37, 38, 39, C40, 41, C42, C43, 44, C45, 46

In these Examples rectangular blocks of resilient polyurethane foam, some being coated (to form well-adhered coatings) according to the invention (using the coating procedure of Examples 5 to 9) and others not being coated, were covered with various fabric coverings according to the instructions of BS 5852: Part 1: (full test). The covered foam test pieces were then assessed for ignitability on the basis of this test (using both parts of the test, viz the smouldering cigarette and butane flame applications).

The details of these Examples, together with the ignition resistance results are summarised in Table 7.

It can be seen that all the fabric-covered foams could be made to pass the test given a sufficient coat weight of vinylidene chloride polymer composition.

EXAMPLES 47 TO 50

In these Examples, rectangular blocks of resilient polyurethane foam were coated according to the invention using the coating procedure of Examples 5 to 9. In each case the coating polymer was the VDC/AN/AA copolymer used in Examples 5 to 9 and other examples. In Examples 47 to 49 the polymer latex was admixed with varying amounts of a colloidal aqueous suspension of Sb₂O₅ (50% by weight solids content). In Example 50, no synergist was incorporated with the polymer latex. The coatings formed were well-adhered. The coated blocks were then covered with Dralon Velvet according to the instructions of BS 5852: Part 1. The covered foam test pieces were assessed for ignitability on the basis of this test (using only the butane flame part).

The details of these Examples together with the ignition resistance results are summarised in Table 8.

It can be seen that the colloidal form of the antimony synergist is effective at a much lower level than the antimony synergist added in the form of a fine powder (compare Examples 47 to 49 with Examples C35 and 36). Also, Example 50 shows that provided the coating weight is sufficiently high, the use of a synergist is not essential.

EXAMPLE C51

This Example was essentially a repeat of Example 50 except that a plasticised vinyl chloride polymer composition was used in place of the vinylidene chloride copolymer composition. The composition was derived from a latex (26.6.% solids) of a vinyl chloride homopolymer (containing 57% by weight of Cl) in admixture

TABLE 7

| Ex No | Covering Fabric | Coating Polymer | Synergist used and % by wt based on wt of coating polymer | % Cl by wt based on wt of coating polymer | Coating weight g/m² | Ignition Resistance BS 5852: Part 1 | |
|---|---|---|---|---|---|---|---|
| | | | | | | Smouldering Cigarette | Butane Flame |
| C34 | Dralon Velvet | None | — | — | — | Pass | Fail |
| C35 | Dralon Velvet | VDC/AN/ AA Copol. | Sb₂O₃ (89%) | 65 | 270 | Pass | Fail |
| 36 | Dralon Velvet | VDC/AN/ AA Copol. | Sb₂O₃ (89%) | 65 | 340 | Pass | Pass |
| C37 | Plush Polyester | None | — | — | — | Pass | Fail |
| 38 | Plush Polyester | VDC/AN/ AA Copol. | Sb₂O₃ (89%) | 65 | 270 | Pass | Pass |
| 39 | Plush Polyester | VDC/AN/ AA Copol. | Sb₂S₅ (117) | 65 | 90 | Pass | Pass |
| C40 | Plush Acrylic | None | — | — | — | Pass | Fail |
| 41 | Plush Acrylic | VDC/AN/ AA Copol. | Sb₂O₃ (89%) | 65 | 270 | Pass | Pass |
| C42 | Plush Acrylic | VDC/AN/ AA Copol. | Sb₂S₅ (117) | 65 | 90 | Pass | Fail |
| C43 | Flat woven polyprop. | None | — | — | — | Pass | Fail |
| 44 | Flat woven polyprop. | VDC/AN/ MA Copol. | Sb₂O₃ (89%) | 66 | 245 | Pass | Pass |
| C45 | Cotton Velvet | None | — | — | — | Fail | Fail |
| 46 | Cotton Velvet | VDC/AN/ AA Copol. | Sb₂O₃ (89%) | 65 | 340 | Pass | Pass | with a chlorinated paraffin plasticiser 'Cereclor' S52 (containing 52% by weight of Cl) and an organic phosphate plasticiser 'Reofos' 65, the components being in the weight ratio 100/40/20 respectively. The composition thus contained approximately 77% by weight of Cl based on the weight of vinyl chloride polymer.

The latex was brush coated onto the foam blocks and allowed to dry at ambient temperature. The coated blocks were covered with Dralon Velvet according to the instructions of BS 5852: Part 1 and then assessed for ignitability on the basis of the butane flame part of the test. The result is given in Table 8 and it can be seen that a vinyl chloride homopolymer (which contains 57% by weight of Cl) gave an unacceptable result in spite of being used with a chlorinated compound (to provide an overall Cl content of 77% based on polymer) and the coating weight being quite substantial.

VDC/AN/AA copolymer/$Sb_2O_5$ mixture. Assemblies were made up using the rectangular foam blocks, each block being covered on one of its broad surfaces (i.e. the 450×300 mm and 450×150 mm surfaces respectively) with the impregnated thin foam sheet and the combination being covered with Dralon Velvet according to the instructions of BS 5852: Part 1. In Example 52, the impregnated thin sheet was not adhered to the rectangular foam blocks; in Examples 53 and 54 the impregnated thin sheet was adhered to the foam blocks (by gluing). Also in Example 53 (but not in Examples 52 and 54) a stockinette interliner was interposed between the coated polyurethane foam blocks and the covering fabric. (Stockinette liners are sometimes used as an aid to fitting foam blocks inside fabric covers and also to reduce friction between fabric and foam during use; it is suspected, however, that they may incur an increased

TABLE 8

| Ex No | Covering Fabric | Coating Polymer or Polymer Composition | Synergist used and % by wt based on wt of coating polymer | % Cl by wt based on wt of coating polymer | Coating weight g/m² | Ignition Resistance BS 5852: Part 1 (Butane Flame) |
|---|---|---|---|---|---|---|
| 47 | Dralon Velvet | VDC/AN/AA Copol. | $Sb_2O_5$ (19%) | 65 | 365 | Pass |
| 48 | Dralon Velvet | VDC/AN/AA Copol. | $Sb_2O_5$ (13%) | 65 | 350 | Pass |
| 49 | Dralon Velvet | VDC/AN/AA Copol. | $Sb_2O_5$ (9%) | 65 | 364 | Pass |
| 50 | Dralon Velvet | VDC/AN/AA Copol. | — | 65 | 435 | Pass |
| C51 | Dralon Velvet | VC homopol. plasticised with chl paraffin and organic phosphate | — | 77 | 440 | Fail |

VC = vinyl chloride

EXAMPLES 52 to 54

In these Examples, rectangular blocks of resilient polyurethane foam for use in BS 5852: Part 1 (dimensions 450×300×75 mm and coated according to the invention, but using the alternative embodiment to that employed in the preceding Examples. Thus thin polyurethane foam sheet (1.5 mm thick) was impregnated with a mixture of the VDC/AN/AA copolymer used in Examples 5–9 and other Examples) and $Sb_2O_5$ synergist (used in Examples 47 to 49) by roller application of a mixture of the polymer latex and $Sb_2O_5$ suspension to the thin foam sheet followed by air drying; this caused the thin foam sheet to become impregnated with the fire hazard.) The covered foam test pieces were assessed for ignitability as the basis of the test of BS 5852: Part 1(using only the butane flame part).

The details of these Examples together with the ignition resistance results are summarised in Table 9.

TABLE 9

| Ex No | Covering Fabric | Coating Polymer dispersed in thin layer of plastics material | Synergist used and % by wt based on wt of coating polymer | Whether thin plastics layer adhered to foam block | % Cl by wt based on wt of coating polymer | Coating weight* g/m² | Ignition Resistance BS 5852: Part 1 (Butane Flame) |
|---|---|---|---|---|---|---|---|
| 52 | Dralon Velvet | VDC/AN/AA Copol. | $Sb_2O_5$ (19%) | No | 65 | 361 | Pass |
| 53 | Dralon Velvet with Stockinette interliner | VDC/AN/AA Copol. | $Sb_2O_5$ (19%) | Yes | 65 | 350 | Pass |
| 54 | Dralon Velvet | VDC/AN/AA Copol. | $Sb_2O_5$ (19%) | Yes | 65 | 350 | Pass |

*This weight does not include the weight of the thin layer of plastics material.

We claim:

1. A combination passing a flame test carried out according to BS 5852: Part 1, said combination comprising a resilient polyurethane foam and an upholstery covering material wherein said foam has on at least one surface thereof at least one coating of at least one vinylidene shloride copolymer containing at least 82% to 95% by weight of vinylidene chloride units, or a composition thereof, wherein the vinylidene chloride copolymer or composition thereof is substantially absent from the interior of the foam, and the amount of chlorine in the at least one vinylidene chloride copolymer or composition thereof is at least 60% by weight based on the weight of the at least one vinylidene chloride copolymer.

2. A combination according to claim 1 wherein the coating is an adherent coating derived from a solution or latex dispersion of the vinylidene chloride copolymer or composition thereof in a liquid carrier medium which has been applied to the foam and the liquid carrier medium removed.

3. A combination according to claim 1 wherein the coating is derived from a discrete thin layer of a polymeric material having dispersed therein the vinylidene chloride copolymer or composition thereof.

4. A combination according to claim 1 wherein said coating comprises a vinylidene chloride copolymer composition which includes at least one synergist fire-retardant compound.

5. A combination according to claim 4 wherein the fire-retardant compound is selected from the oxides and sulphides of Sb, Fe, Mo and Sn.

6. A combination according to claim 4 wherein the synergist is present in an amount of 5 to 180% by weight based on the dry weight of the at least one vinylidene chloride copolymer used for the coating.

7. A combination according to claim 1 wherein said coating is provided by a vinylidene chloride copolymer composition comprising a vinylidene chloride copolymer plasticised with a plasticiser which is normally non-inflammable or itself possesses fire-retardant properties.

8. A combination according to claim 1 wherein the foam has a coat weight of 50 to 600 g/m$^2$.

* * * * *